(12) United States Patent
Boyle

(10) Patent No.: US 7,240,161 B1
(45) Date of Patent: Jul. 3, 2007

(54) INSTRUCTION PREFETCH CACHING FOR REMOTE MEMORY

(75) Inventor: William B. Boyle, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 399 days.

(21) Appl. No.: 10/633,257

(22) Filed: Jul. 31, 2003

(51) Int. Cl.
G06F 9/38 (2006.01)

(52) U.S. Cl. .................. 711/137; 711/213; 711/204; 712/207; 712/237; 710/240

(58) Field of Classification Search ............... None
See application file for complete search history.

(56) References Cited

U.S. PATENT DOCUMENTS

| | | | | |
|---|---|---|---|---|
| 6,401,187 B1* | 6/2002 | Motokawa et al. | ......... | 711/213 |
| 6,516,389 B1* | 2/2003 | Uchihori | ............ | 711/137 |
| 6,789,132 B2* | 9/2004 | Hoskins | ............ | 710/5 |
| 7,000,077 B2* | 2/2006 | Grimsrud et al. | ........... | 711/137 |
| 2004/0044847 A1* | 3/2004 | Ray et al. | ............ | 711/122 |
| 2004/0148470 A1* | 7/2004 | Schulz | ............ | 711/137 |
| 2005/0071571 A1* | 3/2005 | Luick | ............ | 711/137 |

* cited by examiner

Primary Examiner—B. James Peikari
(74) Attorney, Agent, or Firm—Jason T. Evans, Esq.

(57) ABSTRACT

A disk drive control system comprising a micro-controller, a micro-controller cache system adapted to store micro-controller data for access by the micro-controller, a buffer manager adapted to provide the micro-controller cache system with micro-controller requested data stored in a remote memory, and a cache demand circuit adapted to: a) receive a memory address and a memory access signal, and b) cause the micro-controller cache system to fetch data from the remote memory via the buffer manager based on the received memory address and memory access signal prior to a micro-controller request.

24 Claims, 3 Drawing Sheets

INSTRUCTION PREFETCH CACHING FOR REMOTE MEMORY

FIELD OF THE INVENTION

This invention relates to disk drive control system. More particularly, the present invention is directed to disk drive control system having a cache demand circuit.

BACKGROUND OF THE INVENTION

Disk Drives commonly employ one or more microprocessors or micro-controllers (the terms are used interchangeably) in an embedded control system to control operations of the drive. In order to maximize the performance of the microprocessor, a cache control system is frequently included which minimizes the access time for fetching instructions and data from memory.

As is well known in the art, a cache system depends on locality of reference to provide the expected performance improvement. This means that the memory address range for a particular segment of program code being executed tends to be co-extensive with the range of memory data being stored in the cache. Therefore, most accesses after the cache is initially loaded will be in the cache—i.e. a cache "hit". When a memory access address falls outside the cached segment, i.e. a "cache miss" occurs, the cache control system directs the access to main memory, such as via a buffer manager circuit, and stores the new data in the cache. Generally, when a cache miss occurs, the cache control system fetches a string or burst of data sequential to the miss address, anticipating that subsequent requests will be sequential.

Unfortunately, in many instances this fetching of a string or burst of data may be delayed, thus resulting in the stalling of the microprocessor while the data request is being received. Typically, this delay or latency is introduced by the buffer manager circuit which is tasked with arbitrating access to the main memory between its various clients, such as the microprocessor, the error correction code subsystem, etc. If a client with a higher priority task is arbitrated to access the memory, then the microprocessor request for access to the memory will be delayed unit the higher priority task has accessed the memory. This delay is commonly referred to as the arbitration latency of the buffer manager. A latency-sensitive microprocessor routine, such as an interrupt service routine, can typically not tolerate the arbitration latency of the buffer manager, therefore rendering microprocessor requests to access data in main memory impractical. As a result, the latency-sensitive data will typically have to be stored in a dedicated memory, such as in a static random access memory (SRAM). The SRAM, however, is expensive to implement and is typically of a much smaller size than the main memory so that only a subset of latency-sensitive data can be stored therein.

Accordingly, what is needed is an improved disk drive cache control system which minimizes delays in providing the microprocessor with data stored in the main memory via the buffer manager, to thus offer beneficial cache performance without incurring cost penalties.

SUMMARY OF THE INVENTION

This invention can be regarded as a disk drive control system comprising a micro-controller, a micro-controller cache system adapted to store micro-controller data for access by the micro-controller, a buffer manager adapted to provide the micro-controller cache system with micro-controller requested data stored in a remote memory, and a cache demand circuit adapted to: a) receive a memory address and a memory access signal, and b) cause the micro-controller cache system to fetch data from the remote memory via the buffer manager based on the received memory address and memory access signal prior to a micro-controller request.

This invention can also be regarded as a disk drive control system comprising a micro-controller, a micro-controller cache system adapted to store micro-controller data for access by the micro-controller, a buffer manager adapted to provide the micro-controller cache system with micro-controller requested data stored in a remote memory, and a cache demand circuit adapted to: a) receive a memory address and a memory access signal from the micro-controller, and b) cause the micro-controller cache system to fetch data from the remote memory via the buffer manager based on the received memory address and memory access signal prior to a micro-controller request.

This invention can also be regarded as a disk drive control system comprising a micro-controller, a micro-controller cache system adapted to store micro-controller data for access by the micro-controller, a buffer manager adapted to provide the micro-controller cache system with micro-controller requested data stored in a remote memory, an interrupt circuit adapted to interrupt the micro-controller based on a transmitted interrupt signal, and a cache demand circuit adapted to: a) receive a predetermined memory address from the micro-controller and the transmitted interrupt signal from the interrupt circuit, and b) cause the micro-controller cache system to fetch data from the remote memory via the buffer manager prior to a micro-controller request.

DETAILED DESCRIPTION OF THE INVENTION

Figure 1:
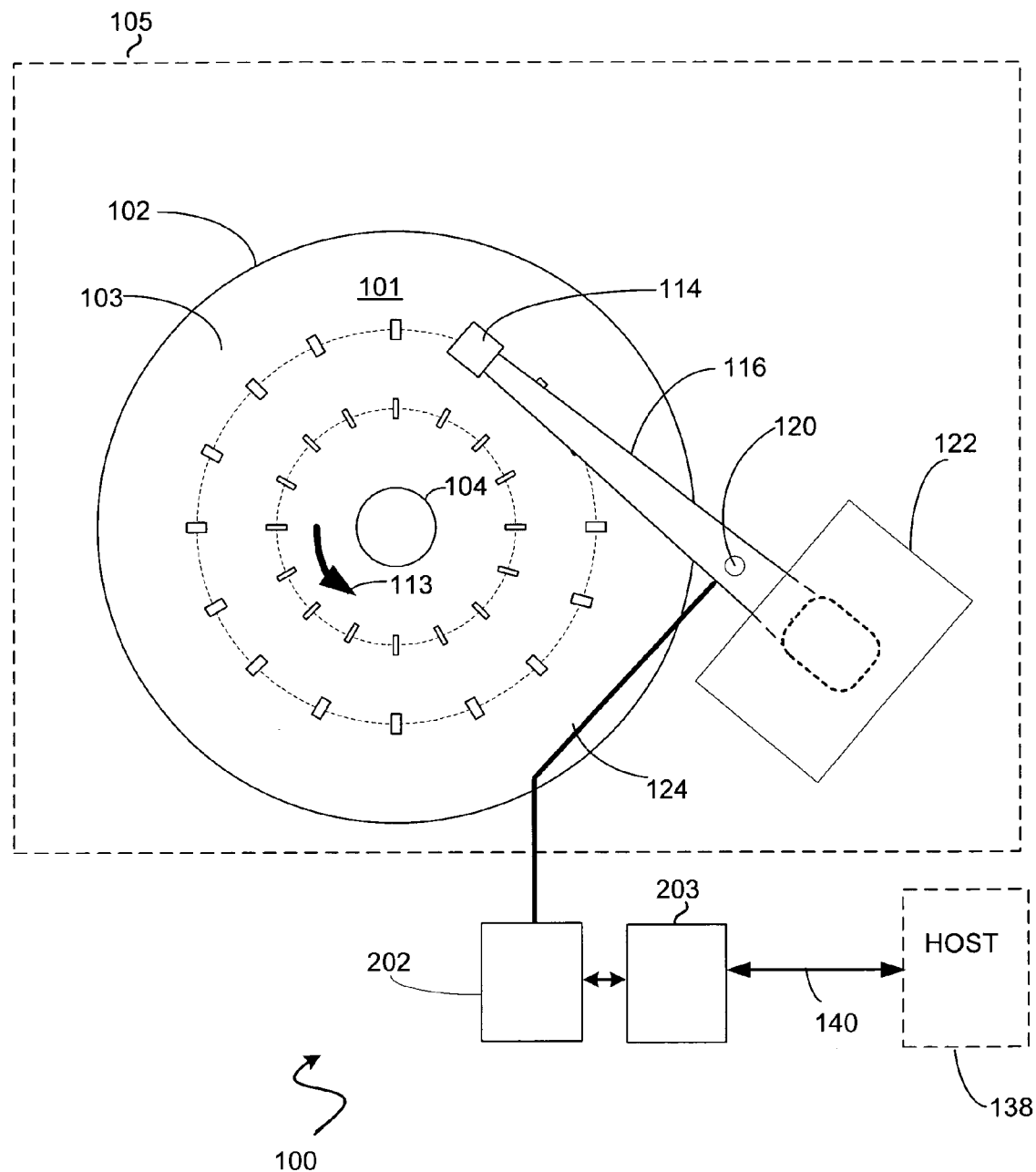
FIG. 1 illustrates an exemplary hard disk drive in which the present invention may be practiced.

With reference to FIG. 1, an exemplary hard disk drive 100 in which the present invention may be practiced is shown. As shown, the hard disk drive 100 includes a head disk assembly (HDA) 105 having one or more disks 102 with a magnetic media 101 formed on each surface 103 of a disk 102. The HDA 105 further comprises a transducer head 114 mounted on a rotary actuator 116 that rotates about a pivot 120 via controlled torques applied by a voice coil motor 122. While the disk drive 100 is in operation, the disk 102 rotates in an exemplary direction 113 about the axis of the spindle 104 at a substantially fixed angular speed such that the surface 103 of the disk 102 moves relative to the head 114.

As shown in FIG. 1, a signal bus 124, such as a flex cable, interconnects the HDA 105 to a control system 202 which can control the movement of the actuator 116 in a manner well known in the art. In addition, the control system 202 sends to and receives signals from the head 114 during read and write operations performed on the disk 102. As also shown in FIG. 1, the control system 202 is interconnected to the interface control system 203 which is in turn interconnected to a host computer 138 by a bus 140 for transferring of data between the hard disk drive 100 and the host 138.

Figure 2:
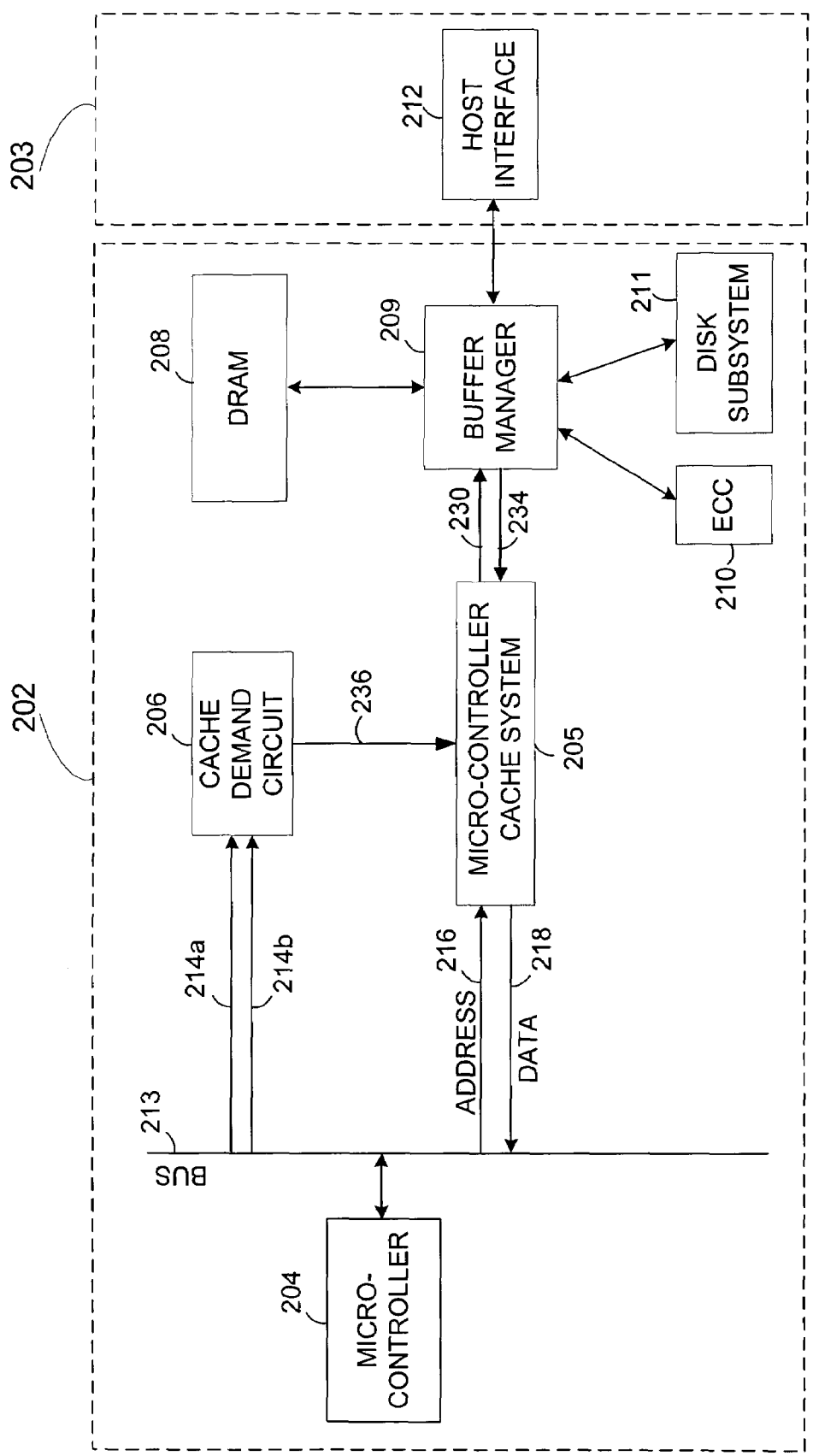
FIG. 2 illustrates a diagram of an embodiment of a control system of the disk drive shown in FIG. 1.

FIG. 2 is a block a diagram of an embodiment of the control system 202 of a disk drive shown in FIG. 1. As shown in FIG. 2, the control system 202 comprises a micro-controller 204, a micro-controller cache system 205 communicating with the micro-controller 204 via the address input 216 and data output 218. The micro-controller cache system 205 is further adapted to store micro-controller data for access by the micro-controller 204. The control system 202 further comprises a buffer manager 209 communicating with the micro-controller cache system 205, a remote memory 208, such as dynamic random access memory (DRAM), and control system clients such as error correction code subsystem 210, host interface subsystem 212 residing in the interface control system 203, and disk subsystem 211 which comprises a read/write channel (not shown), a voice coil motor driver (not shown), and a spindle motor driver (not shown). The buffer manager 209 is adapted to provide the micro-controller cache system 205 with micro-controller requested data stored in the remote memory 208. In an exemplary embodiment, the micro-controller 204 is an Advanced RISC (reduced instruction set computer) Machine (ARM) microprocessor with an ARM 'C' compiler.

In the exemplary embodiment of the present invention shown in FIG. 2, the control system 202 further comprises a cache demand circuit 206 adapted to receive a memory address 214*a* and a memory access signal 214*b* from the micro-controller 204, such via a data bus 213. Suitably, the memory address 214*a* is an address of data residing in the remote memory 208 and the memory access signal 214*b* is a memory or I/O write signal from the micro-controller 204. Suitably, the memory or I/O write signal loads the memory address into a register for use by the cache demand circuit.

The cache demand circuit 206 is adapted to cause the micro-controller cache system 205 to fetch data from the remote memory 208 via the buffer manager 209, such as via request 230, based on the received memory address 214*a* and memory access signal 214*b*, prior to a micro-controller request for execution of the fetched data. Suitably, the memory address 214*a* and a memory access signal 214*b* are received in the cache demand circuit 206 prior to a predetermined guaranteed maximum latency time of the buffer manager 209 in fetching of data from the remote memory 208. The micro-controller cache system 205 is adapted to receive the memory address 214*a* and the memory access signal 214*a* from the cache demand circuit 206, such as via input 236. Suitably, the micro-controller cache system 205 comprises a cache memory (not shown), such as a cache-line architecture memory, having a plurality of cache segments (not shown), such as separate cache-lines, wherein the fetched data 234 is received from the buffer manager 209 and stored in a cache segment of the memory, such as in a cache-line. Suitably, the cache content of the segment(s) in which the fetched data 234 is stored are not replaced prior to a micro-controller 204 request for execution of the fetched data 234.

One advantage of the foregoing feature of the present invention over the prior art is that by implementing a cache demand circuit 206 to cause the fetching of data from the remote memory 208 via the buffer manager 209 prior to a micro-controller request for execution of the fetched data, the delays in providing the micro-controller 204 with the requested data are minimized. In this way, the cache demand circuit 206 offers beneficial cache performance without incurring cost penalties.

Figure 3:
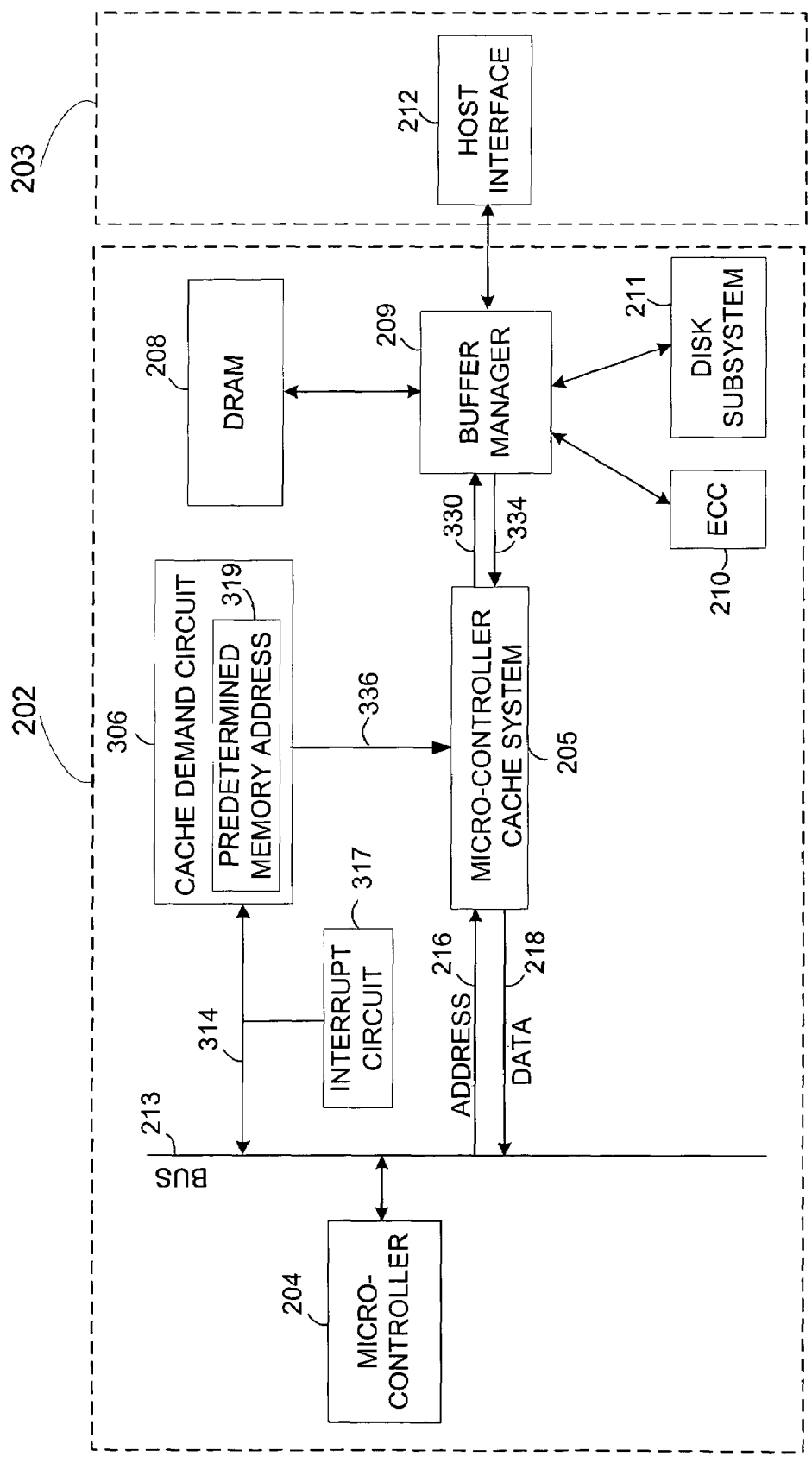
FIG. 3 illustrates a diagram of another embodiment of a control system of the disk drive shown in FIG. 1.

FIG. 3 illustrates a diagram of another embodiment of a control system 202 of the disk drive shown in FIG. 1. As shown in FIG. 3, the control system 202 comprises a micro-controller 204, a micro-controller cache system 205 communicating with the micro-controller 204 via the address input 216 and data output 218. The micro-controller cache system 205 is further adapted to store micro-controller data for access by the micro-controller 204. The control system 202 further comprises a buffer manager 209 communicating with the micro-controller cache system 205, a remote memory 208, such as dynamic random access memory (DRAM), and control system clients such as error correction code subsystem 210, host interface subsystem 212 residing in the interface control system 203, and disk subsystem 211 which comprises a read/write channel (not shown), a voice coil motor driver (not shown), and a spindle motor driver (not shown). The buffer manager 209 is adapted to provide the micro-controller cache system 205 with micro-controller requested data stored in the remote memory 208. In an exemplary embodiment, the micro-controller 204 is an Advanced RISC (reduced instruction set computer) Machine (ARM) microprocessor with an ARM 'C' compiler.

In the exemplary embodiment of the present invention shown in FIG. 3, the control system 202 comprises an interrupt circuit 317, such as a servo-interrupt circuit, adapted to communicate with the micro-controller 204, such via a data bus 213, and to interrupt the micro-controller 204 based on a transmitted interrupt signal 314. The control system 202 further comprises a cache demand circuit 306 adapted to also receive the transmitted interrupt signal 314 from the interrupt circuit 317, suitably as a memory access signal which signifies a priority interrupt signal 314, such as a servo-interrupt signal or a host interrupt signal. In another embodiment, the transmitted interrupt signal 314 can be sourced from the host interface subsystem 212 communicating a host interface event.

The cache demand circuit 306 is adapted to cause the micro-controller cache system 205 to fetch data from the remote memory 208 via the buffer manager 209, such as via request 330, prior to a micro-controller request for execution of the fetched data, such as during the execution of a micro-controller interrupt service routine. In the exemplary embodiment shown in FIG. 3 the received transmitted interrupt signal 314 causes the cache demand circuit 306 to provide a predetermined memory address 319 of data in the remote memory 208 to the micro-controller cache system 205, wherein the micro-controller cache system 205 fetches the data from the remote memory 208 via the buffer manager 209 based on the predetermined memory address 319. Suitably, the predetermined memory address 319 is received in the cache demand circuit 306 prior to the transmitted interrupt signal 314. Suitably, the cache demand circuit 306 is adapted to store the predetermined memory address 319, such as in a in a cache demand circuit register. The micro-controller cache system 205 is adapted to receive the predetermined memory address 319 from the cache demand circuit 306, such as via input 336.

Suitably, the transmitted interrupt signal 314 is received in the cache demand circuit 306 prior to a predetermined guaranteed maximum latency time of the buffer manager 209 in fetching of data from the remote memory 208. Suitably, the micro-controller cache system 205 comprises a cache memory (not shown), such as a cache-line architecture memory, having a plurality of cache segments (not shown), such as separate cache-lines, wherein the fetched data 334 is received from the buffer manager 209 and stored in a cache segment of the memory, such as in a cache-line. Suitably, the cache content of the segment(s) in which the fetched data 334 is stored are not replaced prior to a micro-controller 204 request for execution of the fetched data 334, such as during the execution of a micro-controller interrupt service routine One advantage of the foregoing feature of the present invention over the prior art is that by implementing a cache demand circuit 306 to cause the fetching of an interrupt data from the remote memory 208 via the buffer manager 209 prior to a micro-controller request for execution of the fetched data, the delays in providing the micro-controller 204 with the requested data are minimized. In this way, the cache demand circuit 306 offers beneficial cache performance without incurring cost penalties.

It should be noted that the various features of the foregoing embodiments were discussed separately for clarity of description only and they can be incorporated in whole or in part into a single embodiment of the invention having all or some of these features.

What is claimed is:

1. A cache control system connectable to a remote memory, the cache control system comprising:
   a micro-controller for executing micro-controller data;
   a buffer manager for arbitrating access to the remote memory;
   a micro-controller cache system including a cache memory, the micro-controller cache system coupled to the micro-controller and the buffer manager for fetching and caching micro-controller data stored in the remote memory via the buffer manager for access by the micro-controller; and
   a cache demand circuit coupled to the micro-controller and the micro-controller cache system for receiving an address in the remote memory from the micro-controller and transmitting the address to the micro-controller cache system;
   wherein the micro-controller cache system is responsive to the transmitted address to fetch micro-controller executable data stored at that particular transmitted address into the cache memory before the micro-controller requests that the micro-controller executable data be forwarded to the micro-controller, and
   wherein, after the micro-controller cache system has fetched the micro-controller executable data, the micro-controller requests execution of the micro-controller executable data.

2. The cache control system of claim 1, wherein the cache demand circuit is further responsive to a memory access signal to transmit the address to the micro-controller cache system.

3. The cache control system of claim 2, wherein the cache demand circuit receives the memory access signal from the micro-controller.

4. The cache control system of claim 3, wherein the memory access signal comprises a write signal received from the micro-controller.

5. The cache control system of claim 2, further comprising an interrupt circuit for interrupting the micro-controller based on a transmitted interrupt signal.

6. The cache control system of claim 5, wherein the memory access signal comprises the transmitted Interrupt signal.

7. The cache control system of claim 6, wherein the micro-controller executable data fetched by the micro-controller cache system is executed by the micro-controller during a micro-controller interrupt service routine.

8. The cache control system of claim 2, wherein the cache demand circuit receives the address from the micro-controller before the memory access signal.

9. The cache control system of claim 2, wherein the cache demand circuit is operable to store the address received from the micro-controller.

10. The cache control system of claim 2, wherein the cache demand circuit is operable to transmit the memory access signal to the micro-controller cache system.

11. The cache control system of claim 2, wherein the memory access signal comprises a servo-interrupt signal.

12. The cache control system of claim 2, wherein the memory access signal comprises a host-interrupt signal.

13. The cache control system of claim 1, wherein the buffer manager is in communication with a plurality of disk drive control system clients, including at least one of a disk subsystem, an error correction code subsystem, and a host interface subsystem.

14. A method for caching micro-controller data in a cache control system comprising a micro-controller, a buffer manager coupled to a remote memory, a micro-controller cache system having a cache memory and coupled to the micro-controller and the buffer manager, and a cache demand circuit coupled to the micro-controller and the micro-controller cache system, the method comprising:
   receiving at the cache demand circuit an address in the remote memory from the micro-controller;
   transmitting the address from the cache demand circuit to the microcontroller cache system;
   fetching microcontroller executable data stored at the address via the buffer manager;
   caching the micro-controller executable data stored at that particular transmitted address in the cache memory before the micro-controller requests that the microcontroller executable data be forwarded to the micro-controller; and
   after the micro-controller executable data has been cached, requesting execution of the micro-controller executable data at the micro-controller.

15. The method of claim 14, further comprising receiving at the cache demand circuit a memory access signal, and wherein the step of transmitting the address from the cache demand circuit to the micro-controller cache system is taken upon receipt of the memory access signal.

16. The method of claim 15, further comprising transmitting the memory access signal from the micro-controller to the cache demand circuit.

17. The method of claim 15, wherein the memory access signal comprises a write signal.

18. The method of claim 15, wherein the memory access signal comprises an interrupt signal.

19. The method of claim 18, further comprising executing the micro-controller executable data stored at the address during a microcontroller interrupt service routine.

20. The method of claim 15, wherein the step of receiving the address occurs before the step of receiving the memory access signal.

21. The method of claim 15, further comprising storing the address in the cache demand circuit.

22. The method of claim 15, further comprising transmitting the memory access signal from the cache demand circuit to the micro-controller cache system.

23. The method of claim 15, wherein the memory access signal comprises a servo-interrupt signal.

24. The method of claim 15, wherein the memory access signal comprises a host-interrupt signal.

* * * * *